May 22, 1956  V. S. LOBANOFF  2,746,779
SEAL STRUCTURE
Filed March 12, 1953
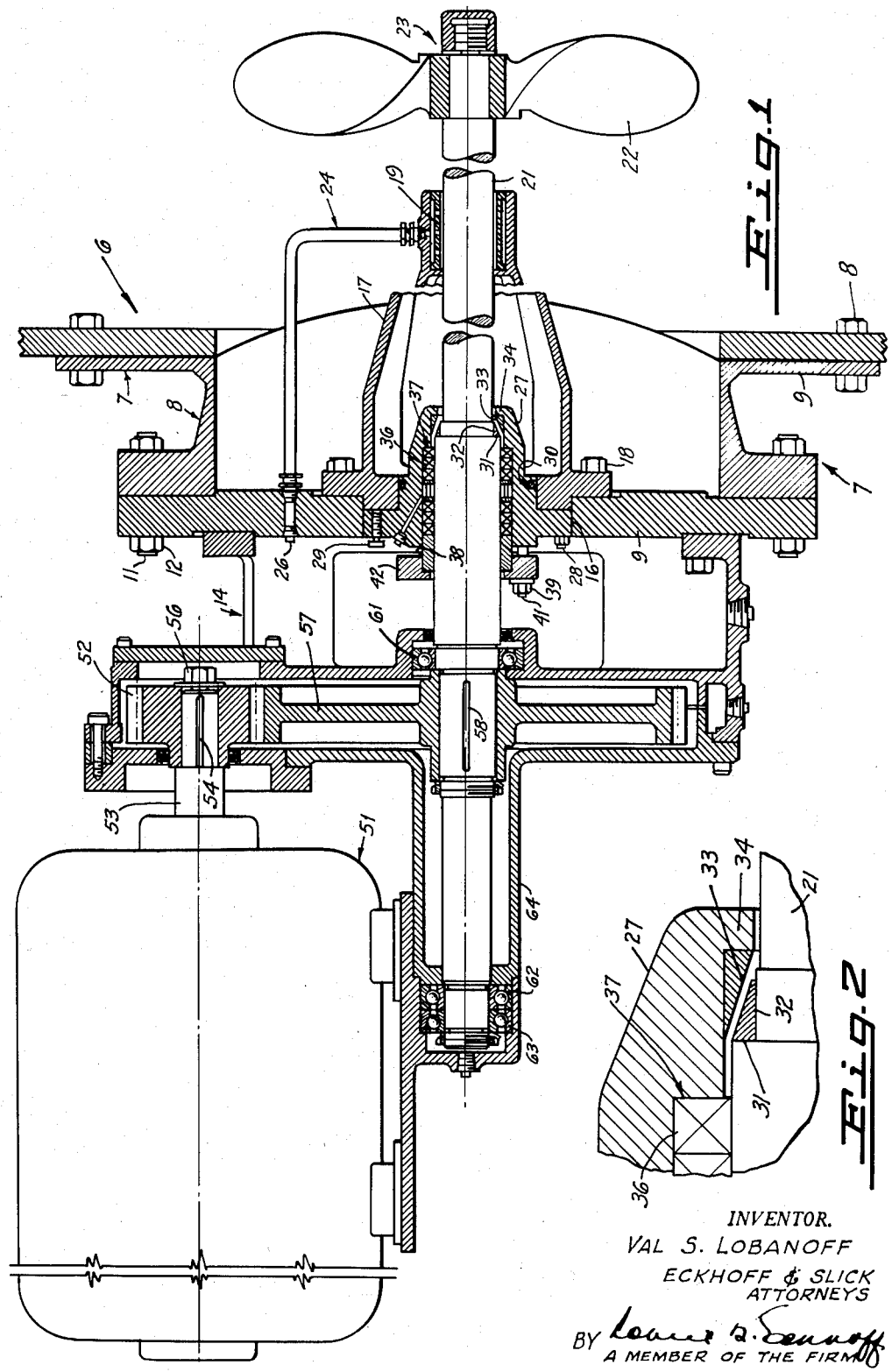
INVENTOR.
VAL S. LOBANOFF
ECKHOFF & SLICK
ATTORNEYS
BY
A MEMBER OF THE FIRM

United States Patent Office 2,746,779
Patented May 22, 1956

---

2,746,779

SEAL STRUCTURE

Val S. Lobanoff, Berkeley, Calif., assignor to United Centrifugal Pumps, a corporation of California Application March 12, 1953, Serial No. 341,874

2 Claims. (Cl. 286—11.13)

This invention relates to a mixing device to be mounted upon the wall of a vessel such as a tank.

The mixer of the present invention includes a prime mover adapted to drive a shaft which extends into the vessel proper, the shaft having a propeller which is rotated within the vessel to stir the contents thereof. Because the shaft passes through the wall of the vessel, it is necessary to provide a gland about the shaft, sealing the shaft. In mixers known heretofore, packing of the gland has been difficult; for example, it has been necessary to draw-off the contents of the vessel inasmuch as the gland had to be repacked from inside the vessel. Further, difficulty has been encountered in maintaining the gland tight against the fluid pressure exerted upon it. Further, the mixers have vibrated unduly because of the excessive distance between the shaft support and the plane of rotation of the propeller.

It is in general the broad object of the present invention to provide an improved mixer construction.

A further object of the present invention is to provide a mixer construction in which the gland can be repacked from outside the vessel in which the mixer is installed and which can be maintained tight against the pressure of the fluid in the vessel.

The invention includes other objects and features of advantage, some of which, together with the foregoing, will appear hereinafter wherein the present preferred form of this invention is disclosed.

In the drawings accompanying and forming a part hereof,

Figure 1 is a side elevation partly in section, through a mixer embodying the present invention, this being shown in place upon a tank.

Figure 2 is an enlarged side elevation, partly in section, showing the mounting of the propeller shaft in the mixer of the present invention.

Referring to the drawing, the sidewall of a suitable tank structure is generally indicated at 6. The mixer is mounted upon the side wall of the tank, bolt or studs (not shown) passed through a flange 7 on one side of an annular ring 8. A plate 9 is mounted upon the other side of the annular ring 8 by threaded rods 11 having nuts 12 thereon. Mounted upon the plate is a prime mover housing structure, generally indicated at 14, and which will be presently further described.

The plate 9 is provided with an annular opening 16 centrally thereof and mounted upon this and projecting forwardly through the annular opening in the tank is a propeller shaft support 17, this being secured in place by studs 18. The support 17 extends horizontally for a considerable distance into the tank, to provide support for bearing 19 for propeller shaft 21. A mixing propeller, generally indicated at 22, is provided on the end of the shaft 21, being secured thereto by nuts 23. Bearing 19 is lubricated through a suitable pipe 24, extending to a connection in plate 9 and an external lubrication fitting 26.

Mounted slidably within and secured by studs 28 upon support 17 is a packing housing, generally indicated at 27. The position of the packing housing 27 relative to support 17 is adjusted by screws 29 bearing against support 17. A packing seal 30 is provided between housing 27 and housing 17.

Within the confines of packing housing 27 the propeller shaft diameter is increased from that which extends beyond the housing to a larger diameter so that a shoulder 31 is formed upon the shaft. Against this is fitted a ring 32 having a tapered or conical face, while a ring 33 having a complementary conical face is fitted in the end of housing 27 and against the nose 34 thereon. Housing 27 is relieved as at 36 and suitable packing, generally indicated at 37, is placed therein and about the shaft to provide a suitable seal. The tension on the packing is adjusted by ring 38 fitting within the housing 27 and bearing upon the packing 37. The tension upon the packing is adjusted by means of nuts 39 on threaded rods 41 extending from the housing and through the recessed flange 42, which bears upon the ring 38.

When it is desired to replace the packing 37, this can be effected readily by adjusting screws 29 to bring the complementary conical faces on rings 32 and 33 into abutment and thus provide a positive seal about the shaft within the tank. The packing 37 can then be replaced from the outside of the tank without dismantling the mixer or having to empty the tank.

To drive the mixer, a prime mover, generally indicated at 51, is mounted upon the prime mover housing 14, a pinion gear 52 being mounted upon the prime mover shaft 53 and secured thereto by a key 54 and a screw 56. Pinion 52 drives a gear 57, this being secured by key 58 upon the shaft 21.

To provide additional rotational support for shaft 21, ball bearing 61 is mounted in housing 14 adjacent to the gear 57, while the extending end of the shaft is mounted in ball bearings 62 and 63 in extension 64 on the housing 14. Housing 14 is made up of suitable components so that the various parts can be readily assembled; these will be apparent upon the consideration of the drawing, and I have not described them in detail.

From the foregoing, it will be apparent that I have provided an improved mixing device which can be readily mounted upon a suitable aperture in the side of a tank and which can be repacked from time to time as necessary without disturbing the mixer, its position upon the tank, or the contents of the tank.

I claim:

1. A structure for sealing a shaft extending through a wall, the structure comprising a tubular housing having an annular passage therein, a shaft extending through said housing and supported for rotation in said passage, a first ring fixed in position on the shaft and rotatable in the passage, a second ring mounted in the housing at one end of the passage cooperatively adjacent the first ring, said rings each having a face thereon adapted to engage a cooperating face on the other ring to provide a positive seal about the shaft, a threaded member extending through the tubular housing and bearing against said wall whereby turning said threaded member moves the housing to move the second ring into and out of engagement with the first ring, and sealing means between the shaft and the housing and insertable and withdrawable from between the shaft and the housing at the other end of the housing.

2. A structure for sealing a shaft extending through a wall, the structure comprising a tubular housing open at opposite ends, a shaft extending through said housing, a first and a second ring mounted respectively on the shaft and at one end of the housing and adapted when engaged to provide a positive fluid seal between the housing and the shaft, a threaded member extending through the tubular housing and bearing against said wall whereby turning said threaded member moves the housing selectively along the shaft to move the rings into and out of sealing engagement, packing means mounted between the housing and the shaft and extending from adjacent the first ring to the other end of the housing, and means at the other end of the housing for retaining the packing in place between the shaft and the housing.

References Cited in the file of this patent

UNITED STATES PATENTS

| | | |
|---|---|---|
| 807,981 | Whitaker | Dec. 19, 1905 |
| 1,486,161 | Ross | Mar. 11, 1924 |
| 1,540,539 | Cain | June 2, 1925 |
| 2,096,597 | Seabrooks | Oct. 19, 1937 |
| 2,428,411 | Davis | Oct. 7, 1947 |
| 2,497,168 | Harris | Feb. 14, 1950 |
| 2,612,391 | Boutros | Sept. 30, 1952 |

FOREIGN PATENTS

| | | |
|---|---|---|
| 433,556 | Great Britain | Aug. 16, 1935 |